Figure 1:
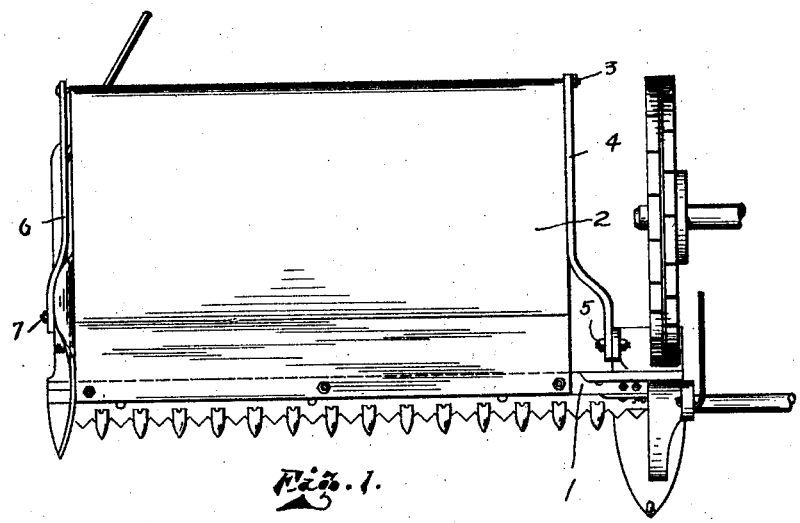

G. JOHNSON.
MOWING MACHINE ATTACHMENT.
APPLICATION FILED FEB. 3, 1921.

1,389,554.

Patented Aug. 30, 1921.

Inventor
Gust Johnson,
By Geo Stevens.
Attorney

UNITED STATES PATENT OFFICE.

GUSTAV JOHNSON, OF DULUTH, MINNESOTA.

MOWING-MACHINE ATTACHMENT.

1,389,554.　　　　　　Specification of Letters Patent.　　Patented Aug. 30, 1921.

Application filed February 3, 1921. Serial No. 442,115.

*To all whom it may concern:*

Be it known that I, GUSTAV JOHNSON, a citizen of the United States, residing at Duluth, in the county of St. Louis and State of Minnesota, have invented certain new and useful Improvements in Mowing-Machine Attachments, of which the following is a specification, reference being had therein to the accompanying drawing.

This invention relates to mowing machines and has special reference to an assembling attachment for such machines whereby the grain or grass which is being cut by the machine may be manually gathered, at intervals, into bunches, during the process of harvesting.

Many devices for a somewhat similar process are old in the art, but all such are designed for mechanical operation, either automatically or otherwise, but in this invention I have devised simple means for use in combination with a mowing machine in a country wherein the use of automatic machinery and other forms of complicated devices are impractical, for example in and about cut over lands which abound in the immediate vicinity of my present home in northern Minnesota, where new land is being broken and upon which crops are raised and harvested among stumps and other obstructions which would prohibit the practical use of automatic binding machines.

To provide a practical device of this character for such special purpose is the principal object of my present invention, and other objects and advantages will appear in the further description thereof.

Figure 2:
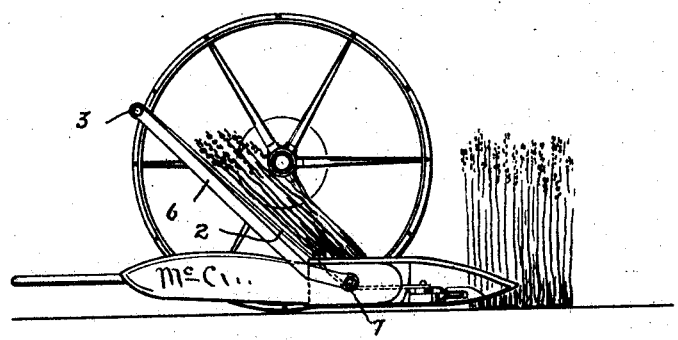

In the accompanying drawings forming part of this application and in which like reference characters indicate like parts:

Figure 1 is a top plan view of the invention, shown applied to the cutter bar of a mowing machine; and, Fig. 2 is a side elevation of Fig. 1.

1 represents the cutter bar of an ordinary horse drawn mowing machine, to the upper rear edge of which, just back of the sickle bar, is securely attached an angularly shaped metal plate or apron 2, the portion adjacent the cutter bar being flat and extending rearwardly a short distance and then inclined rearwardly and upwardly at an angle of substantially 45 degrees, where it is bent over upon and is supported by a rod 3. The rod 3 is held parallel with the cutter bar by an outwardly bent arm 4 attached at its lower end in any suitable manner to the head of the cutter bar, as at 5; while the opposite end of the rod 3 is supported upon the outer end of the somewhat similarly shaped bar or arm 6, fastened as at 7, to the free end of the cutter bar or its coöperatively attached guard.

The utility of this device resides largely in its simplicity and provides means whereby an individual may drive his horse or horses which draw the mowing machine and walk just back of the apron 2 and when a sufficient amount of grain has collected upon the apron, as shown in Fig. 2 of the drawings, he may stop his machine, gather the collected grain in his arms and place it in the form of a bundle on the ground and proceed again to repeat the same operation; or two persons may use the device to still better advantage, one driving and the other intermittently gathering the collected grain from the apron as the machine is stopped for such purpose.

Having thus described my invention, what I claim and desire to secure by Letters Patent, is:

1. The combination with the cutter bar of a mowing machine of the character described, of an apron inclined rearwardly from beyond the bar, the lower edge being attached thereto and the upper corners of the apron supported upon arms rigidly carried by the cutter bar.

2. The combination with the cutter bar of a mowing machine of the character described, of an inclined arm bolted to the head of the bar and extending rearwardly and upwardly, a similar bar attached to the guard at the free end of the cutter bar and extending parallel with the first mentioned arm, and a sheet metal apron, the lower edge of which is attached to the bar, extending rearwardly some distance therefrom forming a flat narrow platform back of the cutter bar and thence upwardly, substantially parallel with the supporting bars and held upon a rod mounted in the extreme upper ends of the supporting bars, substantially as described.

In testimony whereof I hereunto affix my signature in the presence of two witnesses.

GUSTAV JOHNSON.

Witnesses:
　S. C. BRONSON,
　S. GEO. STEVENS.